United States Patent [19]

Furuta

[11] Patent Number: 5,509,029
[45] Date of Patent: Apr. 16, 1996

[54] SERIAL DATA TRANSMISSIONS DEVICE AND TERMINAL UNIT FOR THE SAME

[75] Inventor: Naofumi Furuta, Tachikawa, Japan

[73] Assignee: Sunx Limited, Tachikawa, Japan

[21] Appl. No.: 283,750

[22] Filed: Aug. 1, 1994

[30] Foreign Application Priority Data

Aug. 3, 1993 [JP] Japan .................................. 5-212246
Jun. 14, 1994 [JP] Japan .................................. 6-156709

[51] Int. Cl.$^6$ .................................................. H04B 3/46
[52] U.S. Cl. ........................... 375/228; 375/224; 370/14; 340/815.17
[58] Field of Search ................................. 375/10; 370/13, 370/14, 15, 16, 16.1, 85.1, 85.15; 455/53.1, 54.2; 340/825.06, 825.07, 825.16, 825.17

[56] References Cited

U.S. PATENT DOCUMENTS

| 4,149,144 | 4/1979 | Diefenderfer | 340/147 R |
| 4,161,635 | 7/1979 | Wolaver | 370/15 |
| 4,227,181 | 10/1980 | Brittain | 340/147 R |
| 4,293,947 | 10/1981 | Brittain | 370/85.1 |
| 4,586,040 | 4/1986 | Akiba et al. | 340/825.08 |
| 4,679,192 | 7/1987 | Vanbrabant | 370/85.1 |
| 4,841,520 | 6/1989 | Steely | 370/13 |

FOREIGN PATENT DOCUMENTS

| 59-62247 | 4/1984 | Japan . |
| 59-80096 | 5/1984 | Japan . |
| 61-218241 | 9/1986 | Japan . |
| 62-25534 | 2/1987 | Japan . |
| 62-31234 | 2/1987 | Japan . |
| 62-173830 | 7/1987 | Japan . |
| 62-252221 | 11/1987 | Japan . |
| 62-294345 | 12/1987 | Japan . |
| 1-220549 | 9/1989 | Japan . |
| 2-122744 | 5/1990 | Japan . |
| 2-166950 | 6/1990 | Japan . |
| 3-97397 | 4/1991 | Japan . |
| 3-186040 | 8/1991 | Japan . |
| 3-255745 | 11/1991 | Japan . |

Primary Examiner—Stephen Chin
Assistant Examiner—T. Ghebretinsae
Attorney, Agent, or Firm—Finnegan, Henderson, Farabow, Garrett and Dunner

[57] ABSTRACT

A serial data transmission device has a master unit, plural terminal units, and an abnormal detection unit connected by a signal line. Each terminal unit has an allocated address. The master unit interchanges data with each one of the plural terminal units in sequence. Each interchange of data with one terminal unit constitutes a cycle. Each terminal unit counts the number of data cycles of the master unit. When a terminal unit detects its assigned cycle number in the total sequence of cycles, a confirmation signal is output to the signal line. The abnormal detection unit determines the presence and location of an abnormality in accordance with the absence of a confirmation signal from a particular terminal.

11 Claims, 9 Drawing Sheets

SERIAL DATA TRANSMISSIONS DEVICE AND TERMINAL UNIT FOR THE SAME

BACKGROUND OF THE INVENTION

1. Field of the Invention

The present invention relates to a serial data transmission device which can find instantaneously an abnormal state such as a line breakage in a transmission line, and a terminal unit suitably used for the same.

2. Description of the Related Art

In various industrial machines and robots, it is necessary that many sensors and actuators are connected to a controller to perform data transmission between them. In order to realize a data transmission between a controller acting as a master unit, and a sensor and an actuator each acting as a terminal unit, a serial transmission system which can reduce the number of cables has been conventionally employed. For such a serial data transmission system, the conventional configuration shown in FIG. 12 has been developed to detect an abnormal transmission line such as line disconnection.

That is, the signal line L derived from the master unit M is connected to the first terminal unit (sensor or actuator) T1. The terminal unit T1 is connected to the second terminal unit T2 via the crossover line L1. The terminating unit Te is connected to the last terminal unit Tn by using repeatedly many crossover lines L1, L2, . . . , Ln.

An address is allocated to each of the terminal units. The master unit M outputs sequentially and serially address information and data to interchange between the terminal units. In this case, the master unit M varies sequentially a specified address to circulate the terminal units T1, T2, . . . , Tn. Data exchange are repeated between the master unit M and the terminal units T1, T2, . . . , Tn by repeating the circulation several times at a predetermined period.

The terminating unit Te has a function that monitors clock pulses for an address specification to detect that a transmission per cycle has completed. When the completion is detected, a confirmation signal is output to the signal line L via the crossover lines Ln, . . . , L2, L1. If there is an abnormal state such as line breakage in the crossover lines Ln, . . . , L2, L1 or the signal line L, the confirmation signal does not return to the master unit M. Hence the master unit M judges that a line breakage has happened to execute an error shooting process such as an alarm output, a system halt.

However, the above structure performs a line disconnection detection by judging merely whether the confirmation signal has returned. Hence even if the master unit M should detect the fact that there is a line breakage in the signal line or the crossover line, it cannot locate where the line disconnection spot of the transmission line is. In order to locate the abnormal occurrence spot, the whole transmission line must be inspected. For that reason, there is a problem that a quick recovery work is disturbed.

A line disconnection detection system which can instantaneously locate a disconnected line spot, for example, is disclosed in Japanese Laid-open Patent Publication No. 62-173830. In this prior art configuration, since the master unit varies sequentially a specified address to circulate respective terminal units, thus communicating sequentially to each of terminal units. The circulation is made several times at a predetermined period to repeat the data exchange between the master unit and each terminal unit.

In this prior art configuration, a confirmation signal is returned from each terminal unit to the master unit every time a data transmission to each terminal unit has been completed. Therefore, in the case where there is a line disconnection in a spot in a transmission line, a confirmation signal is not returned from the terminal unit connected to the transmission line to the master unit so that the line disconnection occurrence position can be easily located.

However, in the prior art disclosed in the Japanese Patent Publication, since a confirmation signal is returned to the master unit every time a data transmission is made to each terminal unit, the master unit has to wait for the transmission to the terminal unlit corresponding to the next address to confirm the confirmation signal returned from each terminal unit. As a result, there is a disadvantage in that the transmission efficiency per unit time is decreased.

SUMMARY OF THE INVENTION

In order to overcome the above mentioned technical problems, the object of the present invention to provide a serial data transmission device which can instantaneously locate an abnormal spot and prevent a decrease in a transmission efficiency.

Another object of the present invention to provide a terminal unit suitable for the serial data transmission device.

According to the present invention, in order to achieve the above object, a serial data transmission device is characterized by a master unit; plural terminal units connected to the master unit via signal lines, each of the terminal units being allocated with an address; whereby a serial data transmission is performed so as to circulate between the terminal units and the master unit by varying a specified address in rotation; each of the terminal units having a cycle counter for counting a cycle number and answering means for outputting a confirmation to the signal lines when the cycle counter counts a predetermined count value allocated to the terminal unit; and an abnormal detection means connected to the signal line, for judging the presence or absence of a confirmation signal from the answering means in each terminal unit corresponding to a count value counted by the cycle counter incorporated in the abnormal detection means.

A terminal unit suitable for a data transmission device, the serial data transmission device is characterized by a master unit; and a plurality of the terminal units connected to the master unit via signal lines, each of the terminal units being allocated with an address; whereby a serial data transmission is performed so as to circulate between the terminal unit and the master unit by varying a specified address in rotation; each of the terminal units including a cycle counter for counting a cycle number, and answering means for outputting a confirmation signal to the signal lines when the cycle counter counts a predetermined count value allocated to the terminal unit.

The signal lines may be characterized by a signal trunk line connected to the master unit, and plural branch signal lines branched in parallel from the signal trunk line and connected to the terminal units, respectively.

Further, an auxiliary signal line is connected to both ends of the signal line to which each terminal unit is connected to form a short circuit by the looping, and a switch is connected in series to the auxiliary signal line.

Further, reset signal output means is connected to the signal line to output a reset signal thereto. The cycle counter reset means is connected to each terminal unit and abnormal detection means to reset the cycle counter based on the reset signal.

The master unit varies a specified address in rotation to circulate respective terminal units, thus transmitting serially signals between the terminal units. The circulation is repeated to repeat a data interchange between the master unit and each terminal unit. In each terminal unit, the cycle counter counts its counting number every time the data transmission is circulated. When the counting reaches a predetermined value allocated to the terminal unit, the answering means outputs a confirmation signal to the signal line. Then, the abnormal detection means connected to the signal line judges whether there is an abnormal state based on the presence or absence of the confirmation signal from each terminal unit.

In explanation with a more concrete example, in the case where five terminal units, for example, are connected to the master unit via the signal lines and values 1 to 5, for example, are allocated to each terminal unit, a confirmation signal is output from a terminal unit allocated with "1" after a data transmission in the first cycle. After a transmission in the second cycle, a confirmation signal is output from the next terminal unit allocated with "2". A confirmation signal is output from the following terminal unit every time the data transmission cycle is repeated. Hence if the abnormal detection means does not receive a confirmation signal after the third data transmission cycle, it is determined that the transmission line to the terminal unit allocated with a value of "3" is in an abnormal state.

The timing at which the abnormal detection means judges the presence or absence of the confirmation signal is once per cycle. The other period of time can be used to execute a data transmission between the master unit and each terminal unit. Hence, it is unnecessary to judge the presence or absence of the confirmation signal every time the master unit transmits data to each terminal unit.

In the case where the configuration includes plural branch signal lines branched in parallel from a trunk signal line and a terminal unit connected to each of the branch signal lines, the number of junctures of the signal lines to terminal units can be reduced, compared with the conventional configuration shown in FIG. 12.

Moreover, with an auxiliary signal line which is formed in a loop shape by short-circuiting both ends of the signal lines connected to respective terminal units, and a switch connected in series to the auxiliary signal line, when the switch is closed, a data transmission can be continued via the auxiliary signal line even if a breakage of the signal line should occur.

For example, when the switch is opened during transmitting a piece of test data before starting operation, if the signal line is disconnected, the auxiliary signal line is placed in a line disconnection state. Then the device locates the disconnection spot immediately.

The cycle counter may operate erroneously during counting due to, for example, noises. If the cycle counter in a terminal unit should count erroneously, the terminal unit may not output a confirmation signal at a desired time. For that reason, the abnormal detection unit may erroneously judge that there is an abnormal state even if there is no abnormal state in the transmission line. Thereafter, since the cycle counter cannot return to its normal count value, it cannot output a confirmation signal where a confirmation signal has to be output again. For example, when the cycle counter in a terminal unit having an address "3" continues sequentially its incrementing operation, it may counts "4" (not "3") at the third circulation. This erroneous counting is succeeded in the following operations. Hence, the count value always is larger by "1" than that of the normal cycle counter. Although the terminal unit outputs normally a confirmation signal every three circulations, it ceases outputting always the confirmation signal because the count value does not coincide with the address value every three circulations.

However, according to the present invention, reset signal output means is connected to the signal line, and cycle counter reset means is connected to each terminal unit and abnormal detection means to reset the cycle counter. Hence, when the reset signal output means outputs a reset signal to a signal line, each cycle counter reset means can reset simultaneously the cycle counter based on the reset signal. For example, by outputting a reset signal at the time the number of circulation has the maximum address value of the terminal unit, all the cycle counters start counting again from the initial state after all terminal units have completely confirmed disconnection or the like. Therefore, even if there is a cycle counter that is continuing an erroneous counting operation, the normal counting operation can be regained.

As described above, according to the present invention, an abnormal spot can be instantaneously located. Since the presence or absence of the confirmation signal is judged only once per cycle, the transmission efficiency per unit time is high. Moreover, the configuration in which terminal units are connected in parallel from the signal trunk line allows a small number of junctures, whereby wiring work can be done quickly. According to the configuration with auxiliary signal line arranged in a loop shape, in addition to the above mentioned advantage, a data transmission can be continued even if there is a disconnection on the signal line. Moreover, a disconnection spot can be immediately located by opening the switch connected to the auxiliary signal line.

Arranging both the reset signal output means and the cycle counter reset means allows a recovery of a normal operation even if the cycle counter counts erroneously during operation. This feature prevents the abnormal detection means from judging erroneously, thus providing higher reliability to the equipment.

These and other objects of the present invention will become apparent from the following drawings and detailed description taken in connection with the drawings.

DESCRIPTION OF THE PREFERRED EMBODIMENTS

First Embodiment

Figure 1:
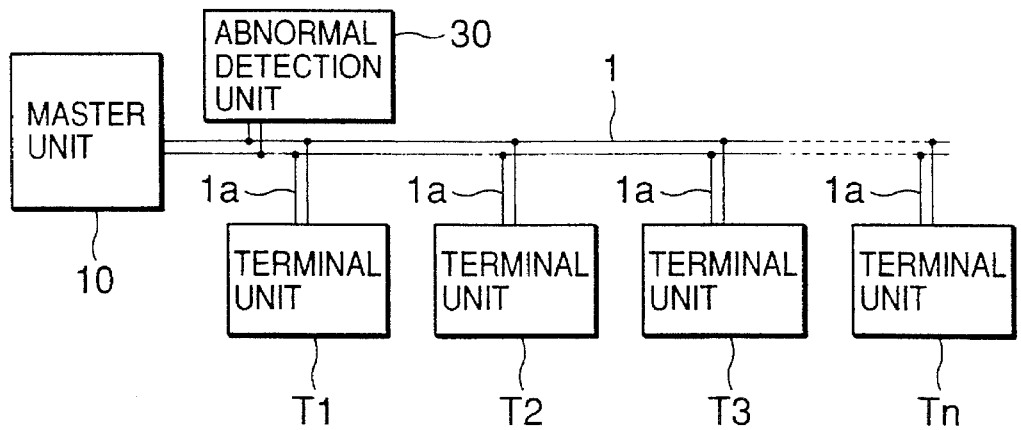
FIG. 1 is a wiring diagram showing a serial data transmission device of the first embodiment according to the present invention.

FIG. 1 shows the entire wiring diagram of the first embodiment according to the present invention. The two-wire signal trunk line 1 is connected to a master unit 10 being a controller used for an industrial machine. Plural branch signal lines 1a, 1a, . . . 1a are branch-connected to the signal trunk line 1 via each coupler (not shown). The terminal units T1, T2, . . . , Tn are connected to the ends of the branch signal lines 1a, respectively. Each of the terminal units is input equipment such as sensors or output equipment such as actuators. A specified address value is allocated to each terminal unit. To the signal trunk line 1, an abnormal detection unit 30 corresponding to abnormal detecting means is branch-connected in parallel between the master unit 10 and the nearest terminal unit T1.

Master Unit

Figure 2A:
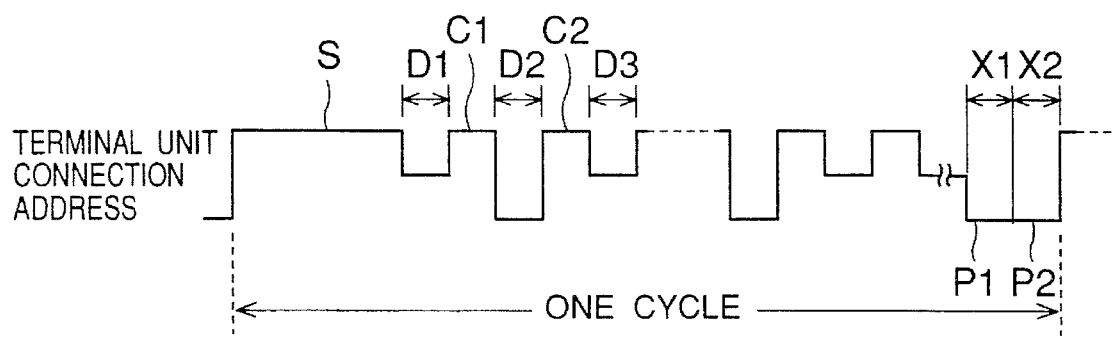
FIG. 2(a) is a waveform diagram for a signal trunk line.
Figure 2B:
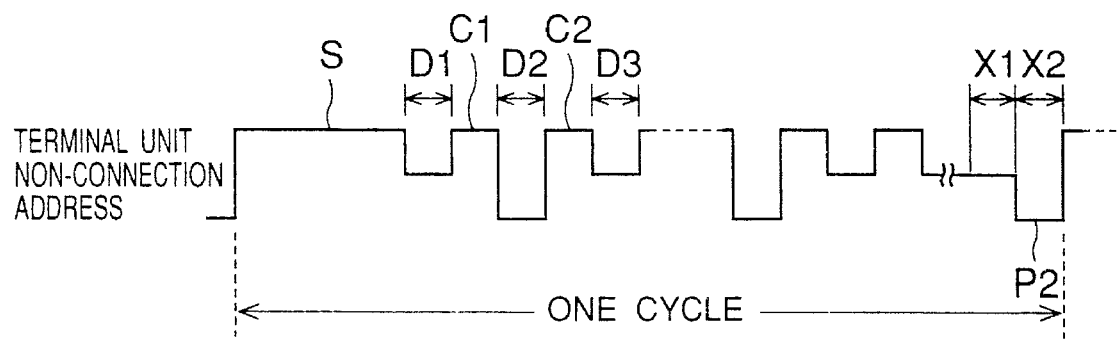
FIG. 2(b) is a waveform diagram for a signal trunk line.

The master unit 10 varies a specified address in rotation to execute a serial data transmission so that data circulate among the terminal units T1, T2, . . . , Tn via the signal trunk line 1. The pulse signals with three levels, for example, shown in FIGS. 2(a) and 2(b) are transmitted to the signal trunk line 1. A start pulse is shown with the letter S in FIGS. 2(a) and 2(b). The master unit 10 outputs the start pulse S at the head of every cycle of data transmission made between each terminal units T1, T2, . . . , Tn. The data duration D1 for a bit comes behind the start pulse S. Then the clock pulse C1 is output from the master unit 10. The data spans D1, D2, D3, . . . , and the clock pulses C1, C2, . . . appear alternately and respectively. In the case where the terminal unit is output equipment, the master unit 10 performs a writing operation to the signal trunk line 1 during the data duration. In the case where the terminal unit is input equipment, the terminal unit performs a writing operation to the signal trunk 1 during the data duration. For example, when the first terminal unit requires 3-bit data, the first to third data duration D1 to D3 are utilized as shown in FIG. 2(a). The final region in one circulation includes a confirmation signal duration X1 and a check signal duration X2. As described later, a confirmation signal P1 is output from each of the terminal units T1, T2, . . . , Tn, and a check signal P2 is output from the abnormal detection unit 30 during the check signal duration X2.

Terminal Units

Figure 3:
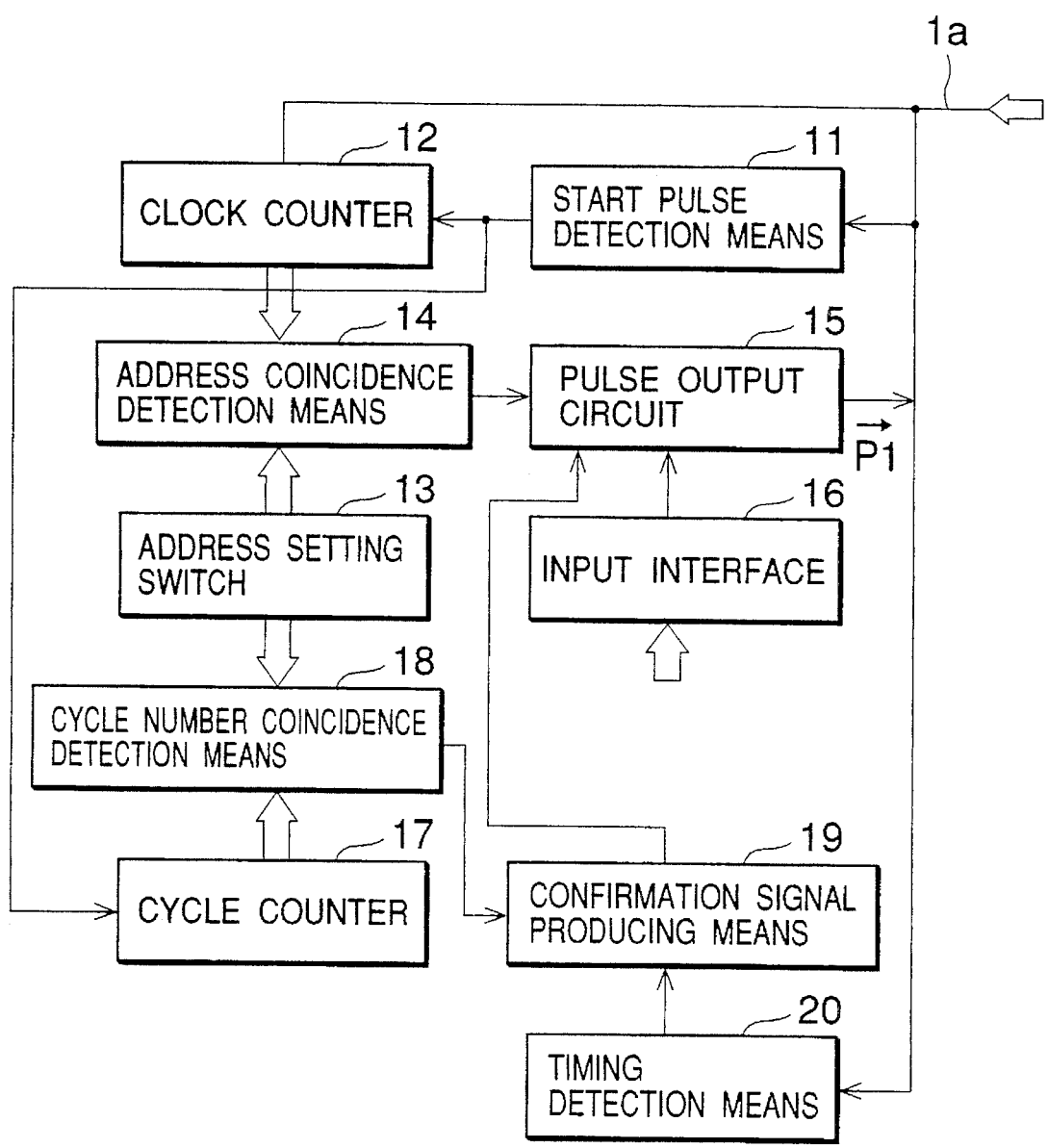
FIG. 3 is a block diagram for a terminal unit acting as input equipment.

Of the terminal units T1, T2, . . . Tn, a terminal unit is constructed as the input equipment such as a sensor in concrete as shown in FIG. 3. That is, the input equipment includes a start pulse detection means 11 for detecting the start signal S in the branch signal line 1a and a clock counter 12 for counting clock pulses. When the start pulse S is detected, the clock counter 12 is reset. Then, the clock counter 12 counts the accumulation value of clock pulses. The address setting switch 13 is arranged to the each of the terminal units T1, T2, . . . Tn. Address is allocated to each of the terminal units. According to the present embodiment, the addresses 1, 2, . . . n are set in the order of the terminal units T1, T2, . . . Tn. The address coincidence detection means 14 compares a value counted by the clock counter 12 with a value set by the address set switch 13. Both the values are coincided to each other, a write timing signal is outputted to the pulse output circuit 15. The pulse output circuit 15 writes data to the branch signal line 1a based on the write timing signal, the data provided from the input interface 16 in accordance with external information regarding, for example, temperature, approach of an object.

On the other hand, the start pulse S is detected by the start pulse detection means 11 and then counted by the cyclic counter 17. That is, the circulation number of a data transmission is counted and the count value is coincidentally compared with a predetermined value allocated to the terminal unit by cycle number coincidence detection means 18. When the two values coincide to each other, a signal is input to the confirmation signal producing means 19. The pulse output circuit 15 outputs a confirmation signal P1 (for example, a voltage level of 0) to the branch signal line 1a in accordance with a timing detected by the timing detection means 20. The timing detection means 20 is so constituted that it detects the termination of one cycle of data transmission when the clock pulse cannot be detected for a predetermined period of time. The maximum count value of the cyclic counter 17 is set to the maximum number of the terminal units connectable to the serial data transmission device. When the circulation number exceeds the maximum count value, the cyclic counter 17 is reset to zero and then repeats its counting operation. As described above, the configuration that outputs the confirmation signal P1 when the circulation number coincides with its address corresponds to the answering means according to the present invention.

Figure 4:
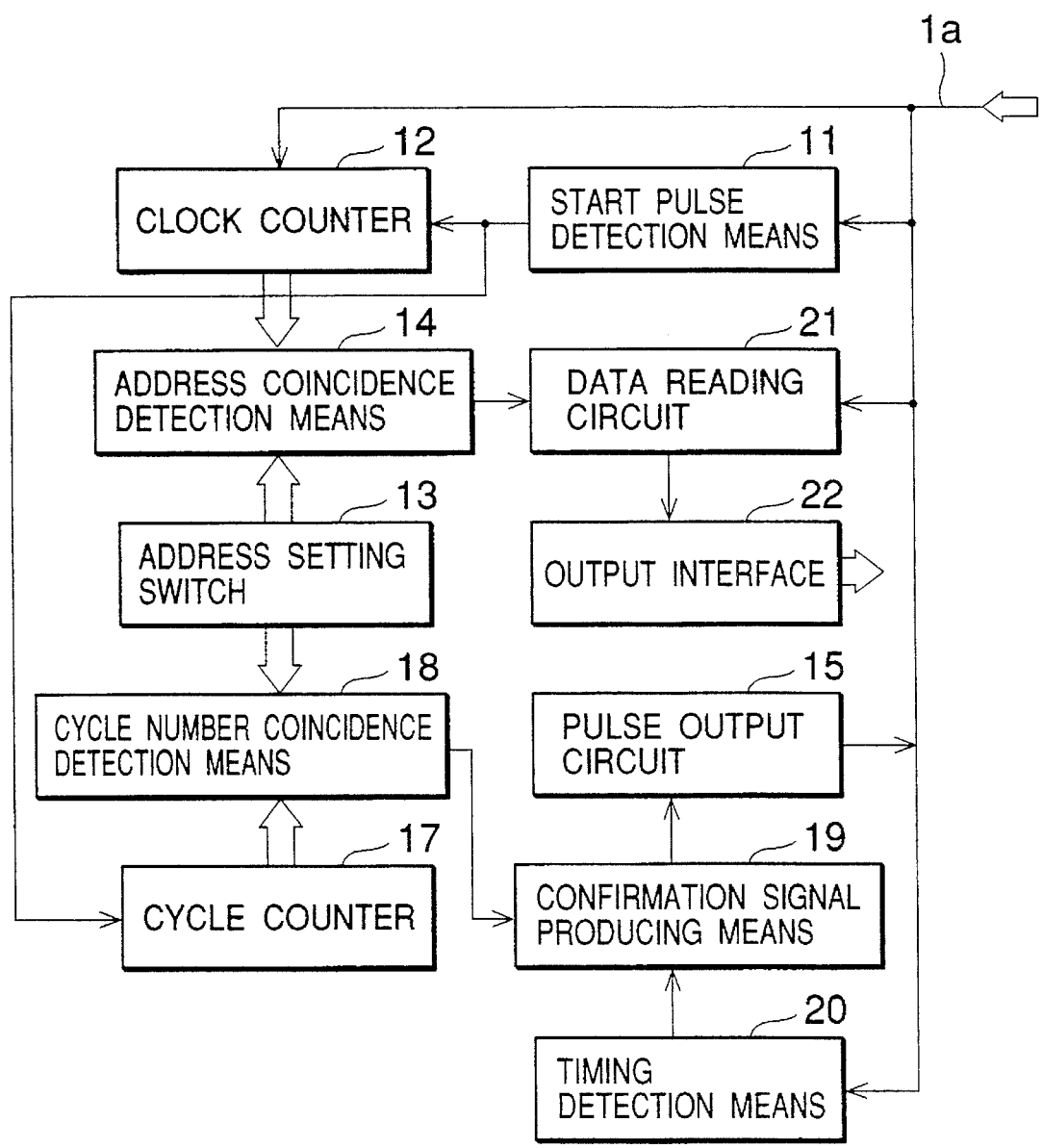
FIG. 4 is a block diagram for a terminal unit acting as output equipment.

The output equipment such as the actuator among the terminal unit T1, T2, . . . Tn has the concrete configuration shown in FIG. 4. This configuration includes additionally a data reading circuit 21, compared with the configuration in FIG. 3. The data reading circuit 21 receives a reading timing signal from the address coincidense detection means 14 when the clock pulse count value is coincided with the address of the terminal unit to read data in the data duration from the branch signal line 1a. The resultant read-out is output to the output circuit (not shown) via the output interface 22. Other configuration includes the cycle counter 17 to output the confirmation signal P1 when the circulation number coincides with its address. Since this configuration is similar to that of the input equipment shown in FIG. 3, the detailed explanation will be omitted by attaching like signs to like elements.

Abnormal Detection Unit

Figure 5:
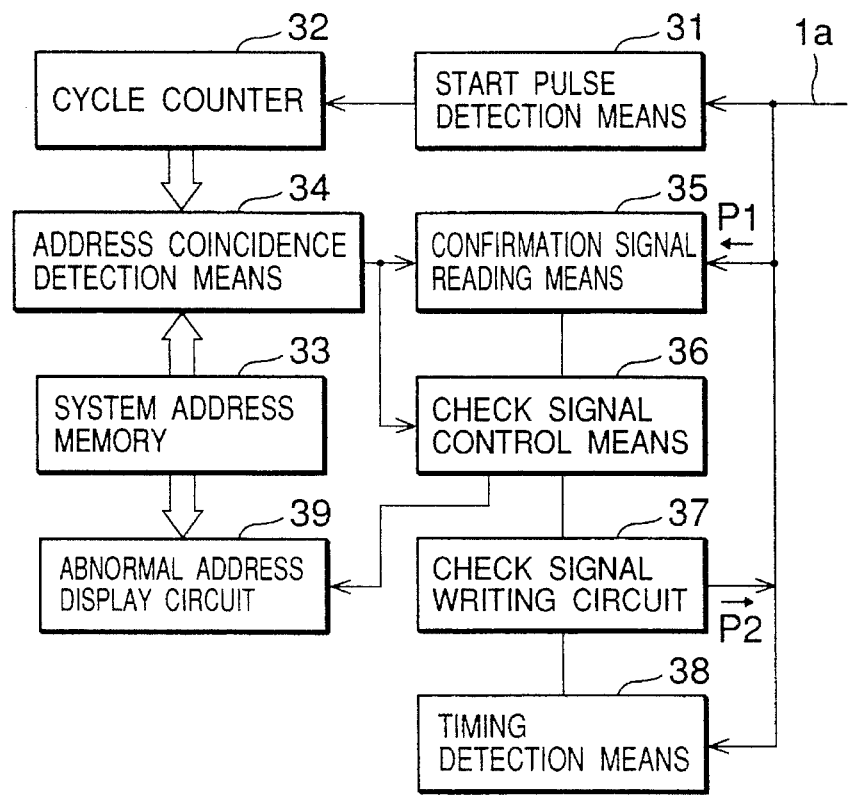
FIG. 5 is a block diagram for an abnormal detection unit.

FIG. 5 shows the concrete configuration of the abnormal detection unit 30. The start pulse detection means 31 detects the start pulse S and then the cycle counter 32 counts the number of the start pulse or the circulation number. The system address memory 33 stores the memory of the address to which actually terminal unit is connected among all addressable addresses. The address coincidence detection means 34 outputs a reading timing pulse to the confirmation signal reading circuit 35 when the count value of the cycle counter 32 coincides with the address to which the terminal unit is connected. The confirmation signal reading means 35 reads whether the confirmation signal P1 has been output from the terminal unit to the signal trunk line 1 during the confirmation signal duration X1 based on the timing pulse.

The check signal control means 36 operates in response to a signal from the confirmation signal reading circuit 35.

The check signal control means 36 outputs the check signal P2 (in this case, a voltage of 0 volt) to the signal trunk line 1 in the case where the following conditions (1) or (2) is satisfied. (1) When the count value from the cycle counter 32 coincides with the address to which a terminal unit is connected, the confirmation signal P1 is output during the confirmation signal duration X1. (2) The count value from the cycle counter 32 coincides with the address to which no terminal unit is connected. As for the output timing of the check signal P2, when a clock pulse cannot be detected during a predetermined period, the timing detection means 38 detects a completion of a data transmission for one cycle, and then outputs the check signal P2 during the check signal duration X2 coming just behind the confirmation signal duration X1 shown in FIG. 2.

When the confirmation signal P1 is not output during the confirmation signal duration X1, the check signal control means 36 inhibits the check signal writing circuit 37 from outputting a check signal P2, and outputs a signal to the abnormal address display circuit 39 to display the abnormal address on an indicator (not shown).

Function

Next, the function of the present embodiment will be described below. When a data transmission is started, the master unit 10 outputs the start pulse S, as shown in FIGS. 2(a) and 2(b). Data exchanges between the terminal units are performed during data durations D1, D2, D3, . . . , while sandwiching clock pulses C1, C2, . . . , one by one. The clock pulse is also used for an address specification. If 3 bits are needed to perform a data transmission to the first terminal unit T1, the second terminal unit T2 receives the third clock pulse C3 to execute an address specification. By updating in rotation and repeatedly such an address specification, a serial signal transmission is performed in rotation between the master unit 10 and each of the terminal units. The one cycle data transmission in which a data transmission is performed among all the terminal units T1, T2, . . . , Tn is repeated many times and at high rate so that the data transmission is continuously performed between the master unit 10 and the terminal units.

During such a data transmission execution, every time one cycle data transmission is performed, the master unit 10 outputs a start pulse S to the signal trunk line 1 and each of the terminal units counts it. When the count value coincides with a specific value (an address of each terminal unit in this embodiment) allocated to each terminal unit, the circulation number coincidence detection means 18 in the terminal unit outputs a signal to the confirmation signal producing means 19. Then, with the timing of the confirmation signal duration X1, the confirmation signal P1 is output to the signal trunk line 1 via the branch signal line 1a.

That is, according to the present embodiment, since the addresses 1, 2, 3, . . . , n are set in the order of the terminal units T1, T2, T3, . . . , Tn, respectively, the confirmation signals P1 is returned to the signal trunk line 1 in the order of the terminal units T1, T2, T3, . . . , Tn every time one circulation including from the first cycle to the n-th cycle is repeated.

On the other hand, the confirmation signal circuit 35 in the abnormal detection unit 30 checks whether the confirmation signal P1 has been output to the signal trunk line 1 during the confirmation signal duration X1 coming at the end of one cycle delta transmission. If there is no trouble along the entire transmission line, the confirmation signal P1 which is output from each of the terminal units T1, T2, T3, . . . Tn every one circulation including the first cycle to the N-th cycle is input to the confirmation signal reading circuit 35 in the abnormal detection unit 30 via the branch signal line 1a and the signal trunk line 1. Thus, the check signal writing circuit 37 in the abnormal detection unit 30 outputs the check signal P2 during the check signal duration X2 being the final timing stage of each cycle (refer to FIG. 2(a)).

When the terminal unit is not connected to all addresses, during the time from (N+1)th to the last circulation of which circulation number corresponds to the final address number, the check signal P2 is also output from the abnormal detection unit 30 to the signal trunk line 1 in the check signal duration X2 (refer to FIG. 2(b)). The master unit 10 detects the check signal P2. When there is the check signal P2, it is judged that the line is in no trouble so that the data transmission is continued as normal.

It is now assumed that an anormal such as a line breakage or contact faulty of the branch line, or a terminal unit failure has occurred in the terminal unit Tn corresponding to the address n. Since the terminal unit Tn cannot receive the signal from the master unit 10, the confirmation signal P1 which is intended to be returned originally at the n-th circulation data transmission cannot be returned to the master unit 10. Hence, since the abnormal detection unit 30 cannot detect the confirmation signal P1 at the time of the n-th circulation data transmission completion, it does not output the check signal P2. When the check signal P2 is not detected at the timing of the check signal duration X2, the master unit 10 judges that the line is in an abnormal state, thus executing an error recovery process such as a system halt. In this case, since the indicator on the abnormal detection unit 30 displays the address of the abnormal terminal unit, the operator can easily locate the failure point by inspecting the terminal unit or the branch signal line of the corresponding address, thus recovering quickly it.

If a line disconnection occurs on way of the signal trunk line 1, the terminal units connected on the side of the master unit 10 with respect to the line disconnection point output the confirmation signals P1 while the terminal units on the opposite side of the master unit 10 with respect to the line disconnection point do not output the confirmation signals P1. Hence, in the same manner as the above case, the master unit 10 performs an error recovery process while the indicator of the abnormal detection unit 30 displays the abnormal address, so that the operator can perform a recovery work.

Needless to say, according to the present embodiment, the confirmation signal P1 is not output every time a data transmission is performed between the master unit 10 and each of the terminal units T1, T2, . . . Tn, but the confirmation signal P1 is output when one cycle data transmission has completed. Therefore, the data transmission efficiency can be largely increased because the data transmission standby time to check the confirmation signal P1 becomes short. With an increasing number of the terminal units, the transmission efficiency is increased remarkably, in comparison with the conventional system.

Furthermore, according to the configuration of the present embodiment, the plural signal lines 1a, 1a, . . . are branched in parallel from the signal trunk line 1 and the terminal unit is connected to the end of each of the branch signal lines 1a. Hence, in comparison with the wiring configuration using the crossover lines L1, L2, . . . , Ln shown in FIG. 12, the number of the junctures to the terminal units are halved and the wiring work can be considerably released.

Second Embodiment

Figure 6:
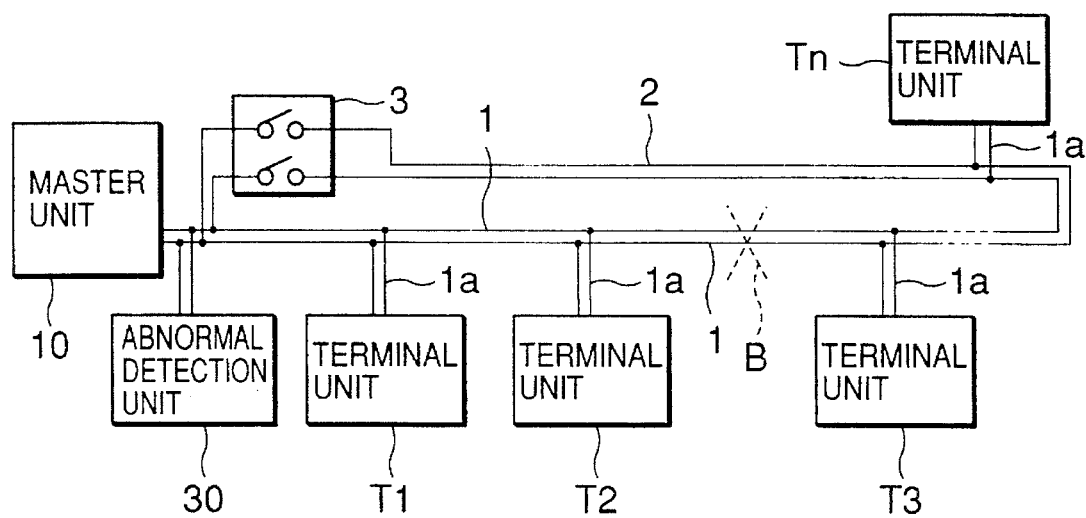
FIG. 6 is a wiring diagram showing the second embodiment of the present invention.

FIG. 6 shows the wiring configuration in the second embodiment. The second embodiment is different from the first embodiment in that the auxiliary signal line 2 is connected so as to return from the end of the signal trunk line 1 near to the master unit 10 via the switch 3. This means that the auxiliary line 2 provided with the switch 3 forms a short-circuits by looping the both ends of the signal trunk line 1 at which terminal units T1, T2, T3, . . . , Tn are connected. When the system is powered on, the switch 3 is turned off automatically and temporarily. If there is no abnormal state, the switch is turned on. The configuration including the master unit 10, the terminal units T1, T2, T3, . . . , Tn, and the abnormal detection unit 30 is similar to that in the first embodiment.

The configuration according to the second embodiment has the following functions and effects. According to the first embodiment, if a line breakage should occur on way of the signal trunk line 1, a signal interchange cannot be quickly performed with a part of the terminal units. Hence, the master unit 10 is designed so as to execute immediately a error recovery process. However, depending on systems, an abrupt operation interruption may cause a loss heavily. According to the second embodiment, since the switch 3 on the auxiliary signal line 2 is in on state during a normal operation, even if a line disconnection should occur, for example, at a spot on the signal trunk line 1 (shown with B), the signal interchange can be performed via the auxiliary signal line 2 with the terminal unit positioned from the accident spot B in the direction leaving the master unit 10 (on the right side of the accident spot B in FIG. 6). Hence, the system operation can be continued in spite of the accident so that a trouble due to an abrupt operation interruption can be avoided.

Moreover, when the system is powered on at starting operation to initiate a data transmission, the switch 3 connected to the auxiliary signal line 2 is temporarily turned off. As a result, in the same manner as the wiring structure of the first embodiment, the abnormal detection unit 30 displays an abnormal address if an abnormal state should occur. For that reason, when there is a line breakage in the signal trunk line 1, it is easily found at a daily checking routine so that a recovery work to the signal trunk line 1 is soon done in response to the indicator on the abnormal detection unit 30. This leads to a very simplified maintenance job in addition to avoidance of an abrupt operation halt.

Third Embodiment

The present embodiment differs from the first embodiment in that a cycle counter reset means is arranged to the terminal unlit and abnormal detection unit and reset signal output means is arranged to the master unit. The other configuration is similar to the first embodiment. Hence, duplicate explanation will be omitted by attaching like signs to like elements.

Figure 10:
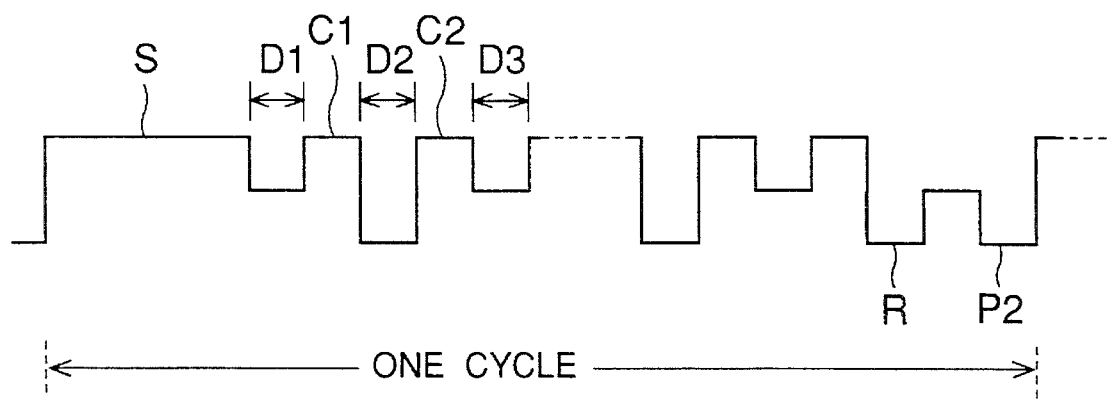
FIG. 10 is a waveform diagram showing a reset pulse according to the present invention.
Figure 11:
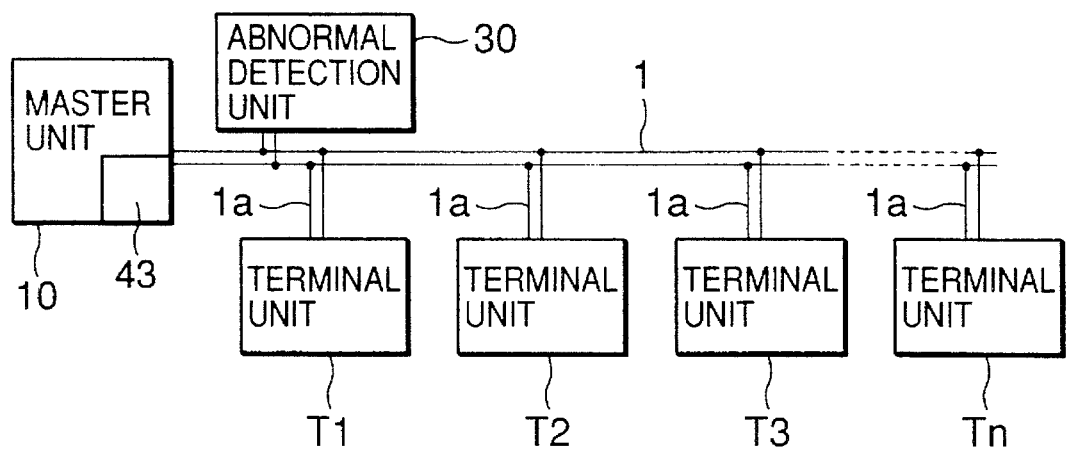
FIG. 11 is a wiring diagram showing a master unit with a reset signal output means according to the present invention.

The reset signal output means 43, as shown in FIG. 11, is arranged within the master unit 10. The output means 43 produces a reset pulse R (for example, at 0 voltage levels) after a chain of clock pulses C1, C2, . . . , as shown in FIG. 10. The reset pulse R is not always output after the clock pulses. The reset signal output means 43 outputs the number of circulations using a counter on a software basis. When the count value reaches a predetermined value, a write circuit (not shown) outputs the reset pulse R to the signal trunk line 1.

Figure 7:
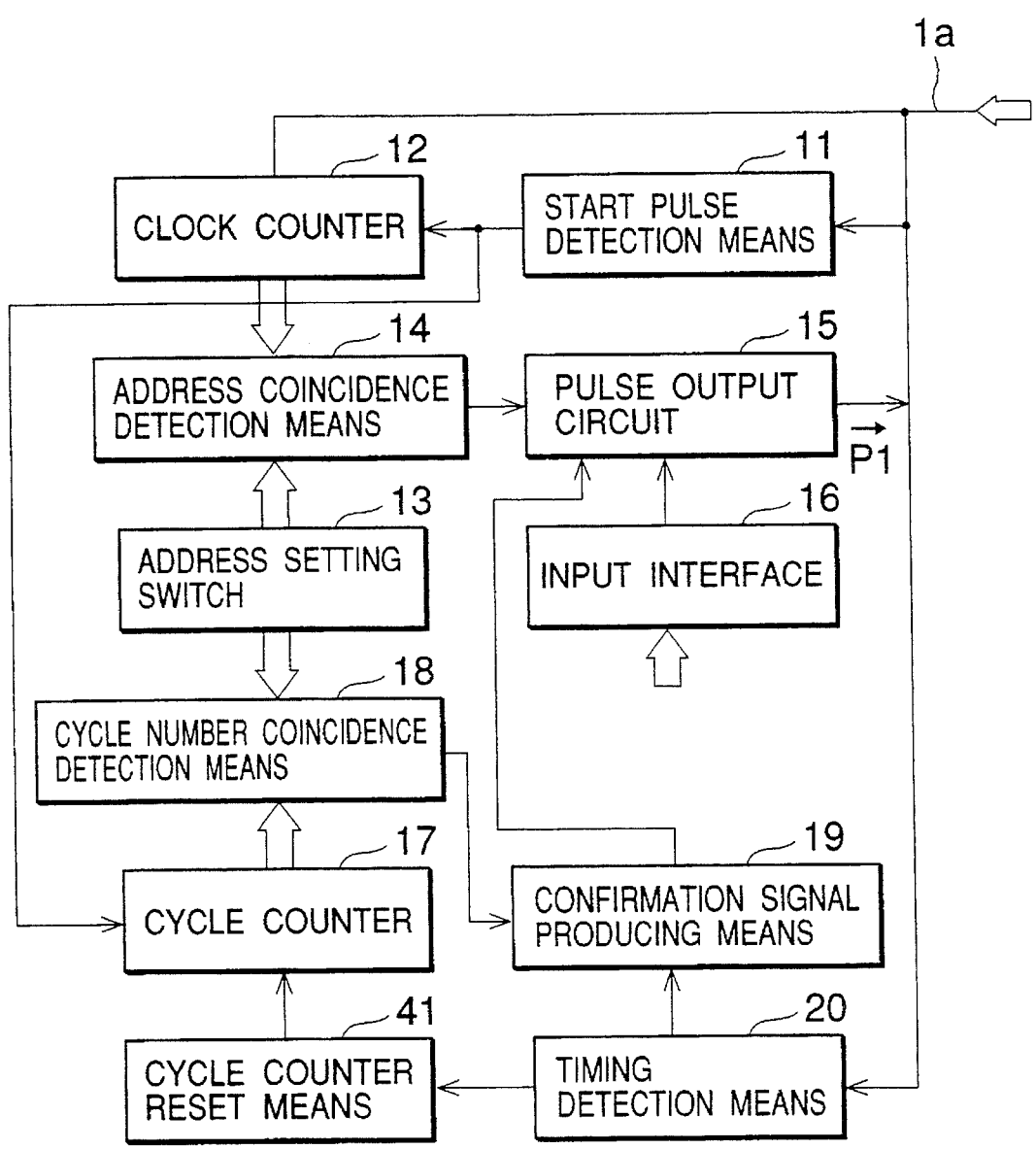
FIG. 7 is a block diagram showing a terminal unit acting as output equipment according to the present invention.
Figure 8:
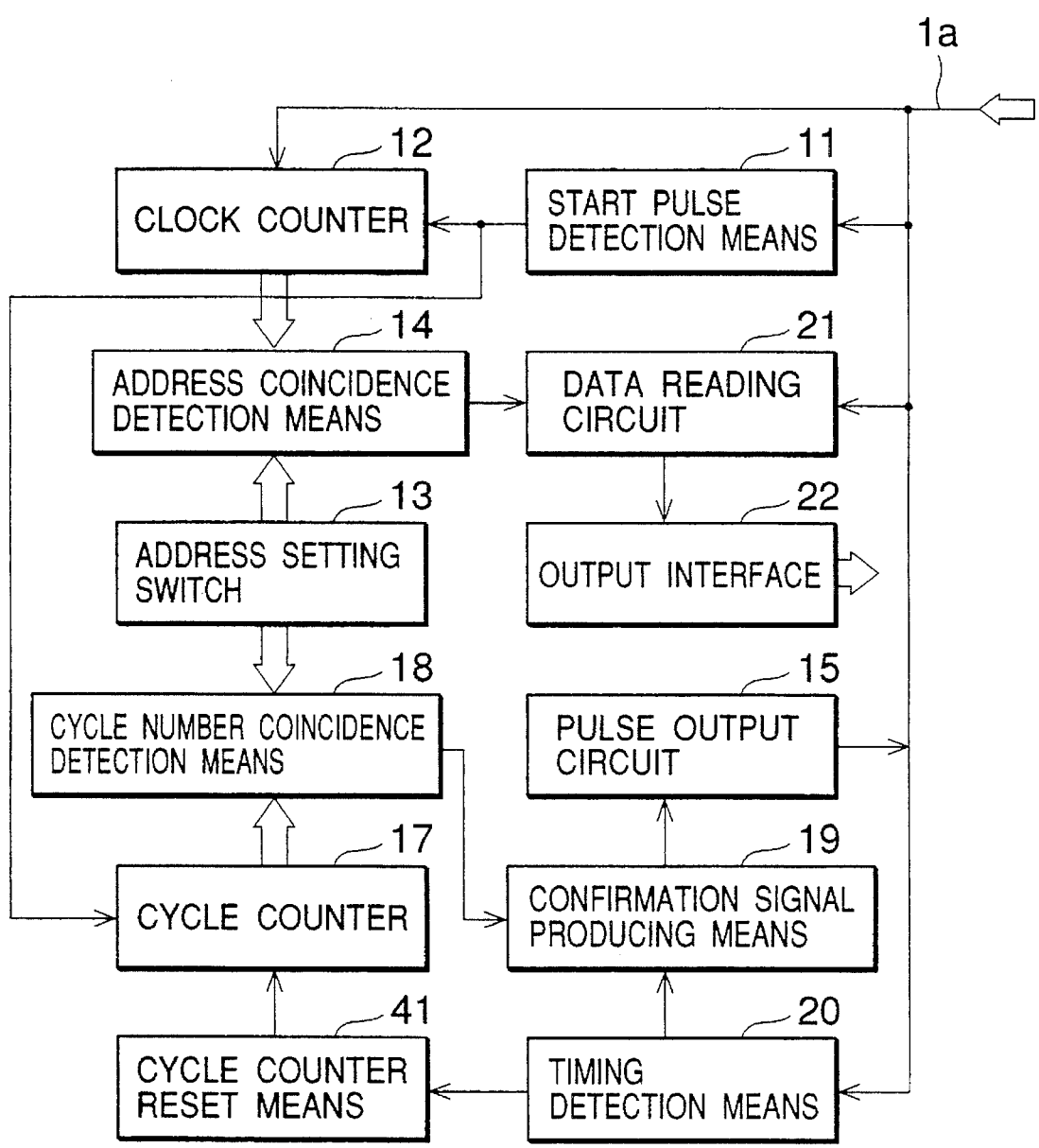
FIG. 8 is a block diagram showing a terminal unit acting as output equipment according to the present invention.
Figure 9:
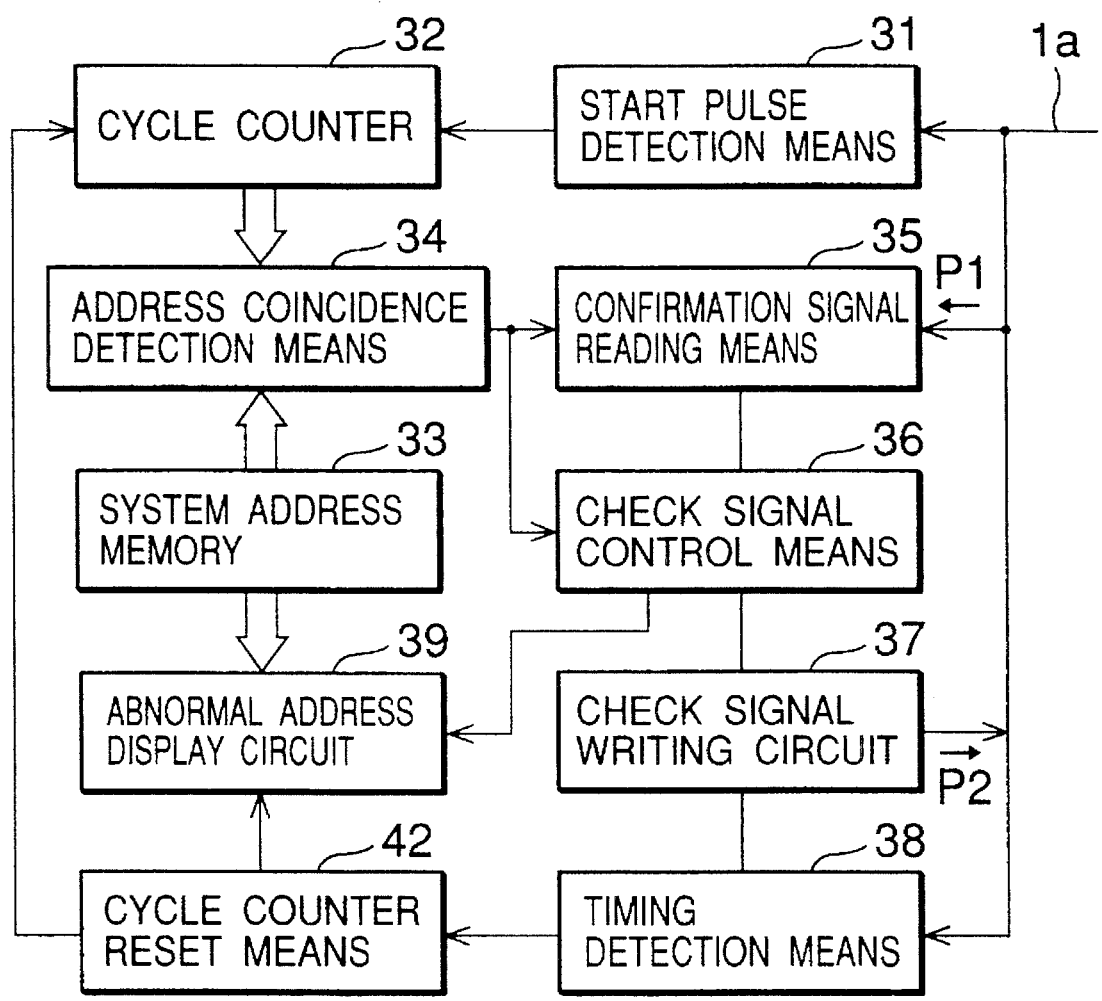
FIG. 9 is a block diagram showing an abnormal detection unit according to the present invention.

On the other hand, FIG. 7 is a block diagram showing input equipment such as a sensor in a terminal unit. FIG. 8 is a block diagram showing output equipment such as an actuator. FIG. 9 is a block diagram showing the abnormal detection unit 30. In the figures, the timing detection means 20 and 38 include means for detecting the reset pulse R from three-level pulse signals transmitted to the signal trunk line 1 to output a detection signal to the cycle counter reset means 41 and 42 in response to the reset pulse R. The cycle counter reset means 41 and 42 output the reset signal to the cycle counter means 17 in response to a detection signal to initialize the cycle counter 17 and 32 or to set the count value to zero. Namely, when the master unit 10 outputs the reset signal R to the signal trunk line 1, the cycle counters 17 and 32 in all the terminal units and the abnormal detection unit 30 are simultaneously reset to a count value of zero.

When the start pulse detection means 11 and 31 detect the start pulse S, the cycle counters 17 and 32 count them. However, noises induced in the signal trunk line 1 may cause an erroneous operation and an erroneous counting operation. If a cycle counter 17 in a terminal unit counts erroneously, the terminal unit does not output a confirmation signal at a necessary time. As a result, the abnormal detection unit 30 decides that an abnormal counting operation exists.

In concrete, it is assumed that when the terminal with an address of "3" detects the third cycle or third start pulse S, the cycle couner 17 couns erroneourly "4" (not "3"). Normally, when the cycle number coincidence detection means 18 decides that the count value has coincided with the self address value, the pulse output circuit 15 outputs a confirmation signal to the branch signal line 1a. However, because the count value does not coincide with the address value, no signal is output to the branch signal line 1a.

In the abnormal detection unit 30, since the cycle counter 32 counts a count value of "3" the confirmation signal reading circuit 35 performs a reading operation to the branch signal line 1a. However, the reading operation is not perfomed because there is no confirmation signal on the signal trunk line 1 so that the check signal writing circuit 37 inhibits its check signal outputting operation. Moreover, the abnormal address display circuit 39 displays the address "3" on the indicator. Hence, with the signal trunk line 1 and the branch signal line 1a in which there is no abnormal (disconnection), if a cycle counter 17 counts erroneously, the abnormal detection unit 30 decides that an abnormal state exists.

In such a case, the cycle counters 17 and 32 in each unit are designed so as to start counting from an initial state (a count value "0") at a system start-up and to reset to "0" when the count value exceeds the maximum address value of the terminal unit to be connected, and to start the recalculating operation. Therefore, if the cycle counters 17 and 32 count erroneously on way of calculation, the counting operation cannot be replaced to the count value to be obtained through the normal counting operation. In closer examination, if the cycle counter 17 counts "4" (not "3") after counting "1" and "2" by skipping "3", it counts always a value of the cycle number plus "1". For that reason, when the confirmation must be again output, the abnormal detection unit 30 decides erroneously without receiving the confirmation signal.

However, in the present embodiment including the reset signal output means 43 and the cycle counter reset means 41 and 42, when the cycle number reaches the maximum address of the terminal unit connected thereto, for example, every predetermined cycle number of times, the reset signal output means 43 outputs the reset pulse R so that the cycle counters 17 and 32 within the terminal units and the abnormal detection units 30 can be reset concurrently to set the count values to zero after the abnormal detection has been performed to all the terminal units.

Hence, according to the present invention, even if a cycle counter has count erroneously during calculation, all the cycle counters 17 and 32 can be reset to a count value of zero or the same count value by outputting the reset pulse R from the master unit 10. As a result, even if an erroneous decision occurs at the first time, a correct decision can be made at the second time. This feature allows a disconnection of the signal trunk line 1 to be detected wihout errors, thus providing the system with higher reliability.

In this embodiment, the master unit 10 outputs the reset pulse R when the cycle number is the maximum address of the terminal unit or the master unit 10 has confirmed a possible disconnection or other troubles by one cycle. However, the master unit 10 may output the reset pulse R, for example, every three or four cycles. Moreover, the reset pulse R need not to be output regularly, but it may be output only at the time the abnormal detection unit 30 decides that there is an abnormal state. In that case, the abnormal detection is reconfirmed to the terminal unit that has decided an abnormal state at the first counting time. When the abnormal detection unit 30 detects the abnormal state after the abnormal detection reconfirmation, it is certain that an abnormal state such as disconnection exists. If it is decided that there is no abnormal state, it is decided that the first abnormal state is caused by an erroneous decision due to an affection of temporary noise. Sequentially, the abnormal detection confirmation is continuously performed to other terminal units. Therefore, since an abnormal state such as disconnection can be detected without any erroneous decision, this embodiment can provide a system with higher reliability.

Other Embodiments

According to the present invention, the following modifications, for example, can be embodied without limiting to only the above-described embodiments.

In the above-described embodiments, a digital signal with three levels is used to distinguish the clock pulse from the data pulse. However, a digital signal with two levels will do, for example, if the clock signal is changed to a burst mode signal. It is also possible to use a digital signal of which modulated amplitude or frequency is overlaid onto a carrier wave. In brief, the updated serial transmission technique to transmit data in coded form using voltage, pluse, frequency and polarity can be widely applied to the present invention.

In the above-described embodiments, the abnormal detection unit 30 is arranged separately from the master unit 10. However, the master unit 10 may have the function of the abnormal detection means.

Each terminal unit may have the structure where a confirmation signal P1 is not output when a terminal unit corresponding the higher address does not return a confirmation signal P1.

In the above-described embodiments, both the confirmation signal duration X1 and the check signal duration X2 are arranged at the final time stage of each cycle. However, without limiting to the above embodiments, the durations X1 and X2 may be arranged in a half way of one cycle or the lead of the next cycle. In brief, the confirmation signal P1 is output every one cycle.

In the above-described embodiments, an indicator is arranged on the abnormal detection unit 30 to display an abnormal address. However, the abnormal detection means may output externally a signal to display or notify of the abnormal address, without arranging an indicator.

In the above-described embodiments, when the circulation number of times coincides with an address of each terminal unit, the confirmation signal P1 is output. However, even if the circulation number of times does not necessarily coincide with the address of each terminal unit, the confirmation signal P1 may be output when the circulation number of times coincides with a predetermined value allocated to each terminal unit. Hence, when the circulation number reaches a value twice, for example, each address, the terminal unit may output a confirmation signal every two circulations. Moreover, the confirmation signal may be output when the address reaches a predetermined value independent of each address.

The abnormal detection means can be connected to any point, without limiting to a point nearest to the master unit.

Without being automatically turned off at a system activation time, the switch 3 connected to the auxiliary signal line 2 shown in FIG. 6 may be manually switched on and off. The switch 3 may be automatically turned off every a predetermined time or circulation number of times.

Figure 12:
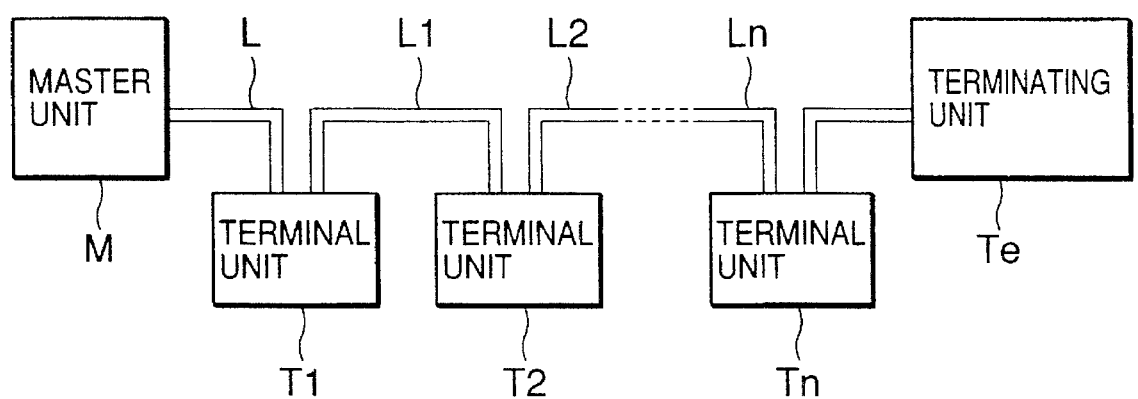
FIG. 12 is a wiring diagram for a conventional serial data transmission device.

The wiring configuration where the master unit is connected to each terminal unit may utilize the crossover line shown in FIG. 12, instead of the parallel branch configuration shown in FIGS. 1 and 6.

In the third embodiment, the reset signal output means is incorporated in the master unit 10. However, it may be incorporated in the abnormal detection unit or connected as a reset unit with reset signal means directly to the signal trunk line.

In the third embodiment, the reset pulse R is output after producing a chain of clock pulses. However, if the timing detection means can distinguish the reset pulse from data and clock pulses, the reselt pulse R can be output at a desired timing. If the reset pulse R, for example, has a voltage level different from those of data or clock pulses, it can be output during outputting clock pulses or at a timing totally different from those of clock pulses.

It should be noted that the present invention can be embodied in various modifications without departing from the spirit or essential characteristics of the subject matter.

What is claimed is:

1. A serial data transmission device comprising:

a master unit;

a plurality of terminal units connected to said master unit via signal lines, each of said plurality of terminal units being allocated an address, said master unit performing a number of cycles of serial data transmission between said terminal units and said master unit by varying a specified address in rotation for each cycle;

each of said terminal units having a first cycle counter for counting the number of serial data transmission cycles performed, and having an answering means for outputting a confirmation signal to said signal lines when said first cycle counter reaches a predetermined count value corresponding to the number of cycles allocated to said first cycle counter for a respective terminal unit; and an abnormal detection means, connected to said signal lines, for judging the presence or absence of said confirmation signal from said answering means in each terminal unit corresponding to a count value counted by a second cycle counter in said abnormal detection means.

2. A serial data transmission device according to claim 1, further comprising:
   a reset signal generating means, having an output connected to said signal lines, for outputting a reset signal to said signal lines; and
   a cycle counter reset means responsive to the reset signal for resetting said first and second cycle counters to an identical count value.

3. A serial data transmission device according to claim 1, wherein said signal lines comprise a signal trunk line connected to said master unit, and a plurality of branch signal lines connecting the terminal units to the signal trunk line in parallel with each other.

4. A serial data transmission device according to claim 3, further comprising:
   a reset signal generating means, having an output connected to said signal lines, for outputting a reset signal to said signal lines; and
   a cycle counter reset means responsive to the reset signal for resetting said first and second cycle counters to an identical count value.

5. A serial data transmission device according to claim 1, further comprising an auxiliary signal line connected to both ends of said signal lines to form a loop circuit connected to said terminal units, and a switch connected in series with said auxiliary signal line.

6. A serial data transmission device according to claim 5, further comprising:
   a reset signal generating means, having output connected to said signal lines, for outputting a reset signal to said signal lines; and
   a cycle counter reset means responsive to the reset signal for resetting said first and second cycle counters to an identical count value.

7. A serial data transmission device according to claim 2, further comprising an auxiliary signal line connected to both ends of said signal lines to which each terminal unit is connected to form a loop circuit, and a switch connected in series with said auxiliary signal line.

8. A serial data transmission device according to claim 3, further comprising an auxiliary signal line connected to both ends of said signal lines to which each terminal unit is connected to form a loop circuit, and a switch connected in series with said auxiliary signal line, said switch being automatically and temporarily turned off to check a disconnection of a signal trunk line when said serial data transmission device is powered, said switch being automatically turned on at times when there is no line break.

9. A serial data transmission device according to claim 4, further comprising an auxiliary signal line connected to both ends of said signal lines to which each terminal unit is connected to form a loop circuit, and a switch connected in series with said auxiliary signal line, said switch being automatically and temporarily turned off to check a disconnection of a signal trunk line when said serial data transmission device is powered, said switch being automatically turned on at times when there is no line break.

10. A terminal unit for use in a serial data transmission device having a master unit and a plurality of other terminal units similar to said terminal unit connected to said master unit via signal lines for communicating distinct cycles of data to each of the plurality of terminal units in rotation, each of the cycles of data including a different terminal address, said terminal unit comprising a clock counter responsive to each pulse signal of a cycle of data communicated on the signal lines for identifying an address in each cycle of data; a cycle counter for counting each cycle of data communicated on the signal lines beginning with an original count number, and answering means responsive to a specific count number of the cycle counter from the original count number for applying a confirmation signal to said signal lines confirming integrity of the signal lines from the master unit.

11. A terminal unit according to claim 10, further comprising:
   a cycle counter reset means responsive to a reset signal for resetting said cycle counter to the original count number.

* * * * *